United States Patent [19]

Hegarty et al.

[11] Patent Number: 4,790,423
[45] Date of Patent: Dec. 13, 1988

[54] BOTTLE STAND UP APPARATUS

[75] Inventors: Patrick J. Hegarty, Belleville; Dennis Amato, Verona, both of N.J.

[73] Assignee: Pace Packaging Corporation, Fairfield, N.J.

[21] Appl. No.: 931,738

[22] Filed: Nov. 17, 1986

[51] Int. Cl.⁴ .................................... B65G 47/24
[52] U.S. Cl. ..................... 198/400; 198/407; 198/413; 198/415
[58] Field of Search ........... 198/400, 406, 407, 412, 198/413, 415, 416, 399

[56] References Cited

U.S. PATENT DOCUMENTS

| 2,316,654 | 4/1943 | Stover | 198/628 X |
| 3,100,562 | 8/1963 | Whelan | 198/400 |
| 3,339,702 | 9/1967 | Novak et al. | 198/400 |
| 3,726,387 | 4/1973 | Krooss | 198/400 |
| 3,894,628 | 7/1975 | Pugh et al. | 198/407 |
| 4,457,421 | 7/1984 | Krooss et al. | 198/415 X |

FOREIGN PATENT DOCUMENTS 1452872 9/1966 France ................. 198/400
1019242 2/1966 United Kingdom ........ 198/400

Primary Examiner—Joseph E. Valenza
Assistant Examiner—Jonathan D. Holmes
Attorney, Agent, or Firm—Stephen E. Feldman

[57] ABSTRACT

Bottles are conveyed by a pair of side gripping belts, either neck leading or base leading in a direction parallel to an axis extending through the neck and the base of the bottle. In the path of the bottle and upstream therefrom is positioned a split ramp, inclined upward relative to the direction of travel. The split ramps interfere with the forward travel of a base leading bottle and cooperates with the gripping belts to cause the neck of the bottle to raise arcuately so as to orient the bottle to a standing position, on its base. Moving belts are disposed between the split ramp. The split ramp allows passage of part of a bottle conveyed in neck leading position such that the moving belts interfere with the forward travel of the neck leading bottle and cause the neck of the bottle to change its direction of travel to an arcuate, upward direction for orienting the bottle to a standing position, on its base.

17 Claims, 2 Drawing Sheets

BOTTLE STAND UP APPARATUS

BACKGROUND OF THE INVENTION (1) Field of the Invention

This invention relates to bottle conveyor apparatus and more particularly to apparatus for uprighting bottles which have been carried along on their sides on the conveyor.

(2) Prior Art

Most bottle conveyor apparatus includes bottle orientation apparatus for uprighting bottles traveling on the conveyor to an upright position, that is a position where the bottle is standing on its base. For the most part, when bottles are introduced on to the conveyor apparatus the bottles are on their sides, some bottles proceeding along the conveyor in a neck leading position, others in a base leading position. Traditionally such bottles have been oriented into a standing upright position, with base down, in several ways.

One approach uses a ramp which engages a moving bottle and applies a torque in one direction to lift the neck of a neck leading bottle and applies a torque in the other direction to drop the base of a base leading bottle. This bottle orientation system uses the same ramp to orient both neck leading and base leading bottles and a favorable elevation adjustment of the ramp for the orientation of neck loading bottles does not produce a favorable corresponding effect on the orientation of base leading bottles.

Another technique provides a trip in the path of a traveling bottle which engages the bottle. The trip cooperates with the moving belts which carry the bottles along. Torque in one direction is exerted on a base leading bottle and torque in the other direction is exerted on a neck leading bottle to effect upright orientation. With this system the same components are used to effect orientation by torque exerted in different directions so that any adjustment of these components must be a compromise.

An example of a conveyor system which includes bottle orientation apparatus can be found in U.S. Pat. No. 4,457,421 while another bottle conveyor system may be found in U.S. Pat. No. 2,316,654.

THE PRESENT INVENTION

The present invention is a bottle stand-up or base orientation apparatus which includes dual ramps surrounding moving belts which engage the neck or base of a moving bottle on a conveyor. The forward moving neck leading bottle engages the moving belts which elevate the neck of the moving bottle and orient the bottle in upright position on its base. The neck of the neck leading bottle passes through the split ramp and engages the centrally located moving belt or belts which belts may be adjusted relative to speed, angle of elevation and position relative to the plane of the split ramps.

The forward moving base leading bottle engages the split ramps which, in cooperation with belts carrying the base leading bottle forward serve to generate a lever action which rotates the bottle to an upright position on its base.

By utilizing a split ramp with a moving belt or belts between the split ramp, the moving belts may be adjusted for maximum efficiency in orienting neck leading bottles without adverse effect on orientation of base leading bottles and the split ramps may be adjusted for maximum efficiency in orienting base leading bottles without adverse effect on orientation of neck leading bottles. Adjustment of the bottle orientation apparatus may be required when there is a change in the size and/or shape of bottle passing through the conveyor.

Another advantage of the present invention is that the structure or configurations of the ramp surface and the belt surface are independent of each other and therefore may be designed for maximum efficiency for a particular bottle part, either bottle base or bottle neck, engagement. Such independent structural configuration provides great flexibility in design parameters which is particularly important in high speed applications where minor dimensional differences become very important.

Another advantage is that the top edge of the ramp can be configured for the requirements of downstream stabilization rather than torque application. This is especially important in today's technology which emphasises high speed application because stability of the bottle immediately after a bottle is uprighted is a difficult problem. Smooth orientation into an upright position whether a bottle is oriented from a neck leading or a base leading position, is important.

It is therefore an object of the present invention to provide a bottle standup apparatus which is capable of maximum efficiency on both base leading and neck leading bottles.

Another object is to provide apparatus for orienting bottles from a lying down position to an upright position which operates independently on base leading bottles and on neck leading bottles.

A further object is to provide bottle upright orienting apparatus which is easily and quickly adjusted for bottle characteristics. These and other objects will become more apparent from reading the following description of the invention with reference to the drawings.

DETAILED DESCRIPTION OF THE INVENTION

Figure 1:
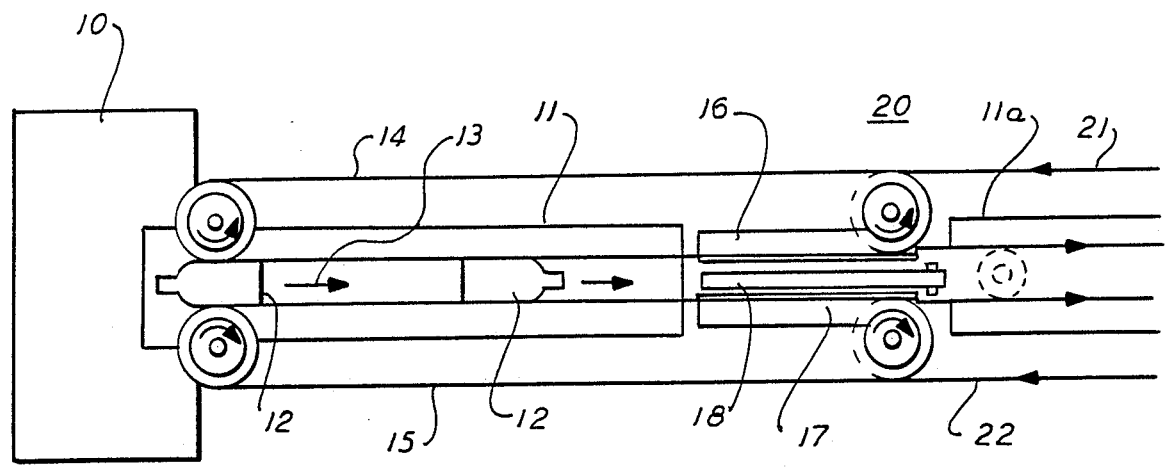
FIG. 1 is a representation of a bottle conveyor system employing the present invention.

FIG. 1 is a plan view of a representation of part of a conveyor system in which bottles, such as plastic or glass bottles are loaded on to a platform 10 and are introduced into the conveyor system in a lying down position. Bottles 12 are fed into the moving elements in either neck leading or base leading alignment. In many bottle conveyor systems the bottles must be positioned upright, that is standing on their bases in order to be filled or labeled. Thus it is often the first function of a conveyor to orient the moving bottles to an upright condition, standing on the base of the bottle.

In the preferred embodiment of the invention, bottles 12 are introduced between opposing moving belts for driving the bottle along its major axis. The belts 14 and 15 grip the bottles introduced from the loading platform and carry each bottle along in the direction of the arrows 13. The distance between the belts 14 and 15 is adjustable and is preferably substantially equal to the smaller cross-sectional dimension of the bottle, whether the bottle is oval or rectangular.

In the path of the bottles is a split ramp and belt assembly 20. The split ramp 16 and 17 and moving belt 18 are inclined in an upward angle. The distance between the ramps 16 and 17 is adjustable in a known manner as is the angle of inclination. The moving belt 18 may be a single belt but is preferably two small width belts such as represented in FIGS. 2a and 3a. The spacing between the ramps 16 and 17 preferably exceeds the outside diameter of the neck of the approaching bottle so that the neck of the bottle may pass through the split ramp and engage the moving belt 18. In some cases where the moving belt 18 is in dual configuration the neck of the bottle may pass through the space between the split ramp and engage itself between the dual belts.

The speed of belt 18 approximates the speed of the belts 14 and 15, however in some cases the speed of belt or belts 18 may be some what faster than the belts 14 and 15.

The ramps 16 and 17 are preferably on the same plane but the upper part of the moving belt 18 or belts 18a and 18b are preferably on a plane somewhat below the plane of the split ramps.

The angle of inclination of both the split ramps and the moving belt or belts is preferably substantially the same, but structurally, the angle of each is preferably individually adjustable.

Figure 2:
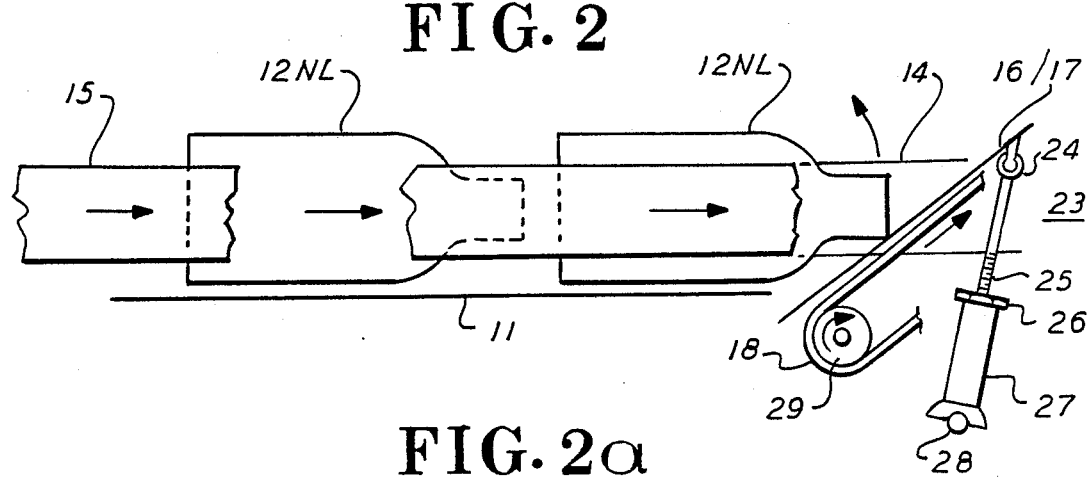
FIG. 2 is a representation, in side view of bottles in a conveyor system approaching the uprighting orientation apparatus in neck leading alignment.
Figure 2A:
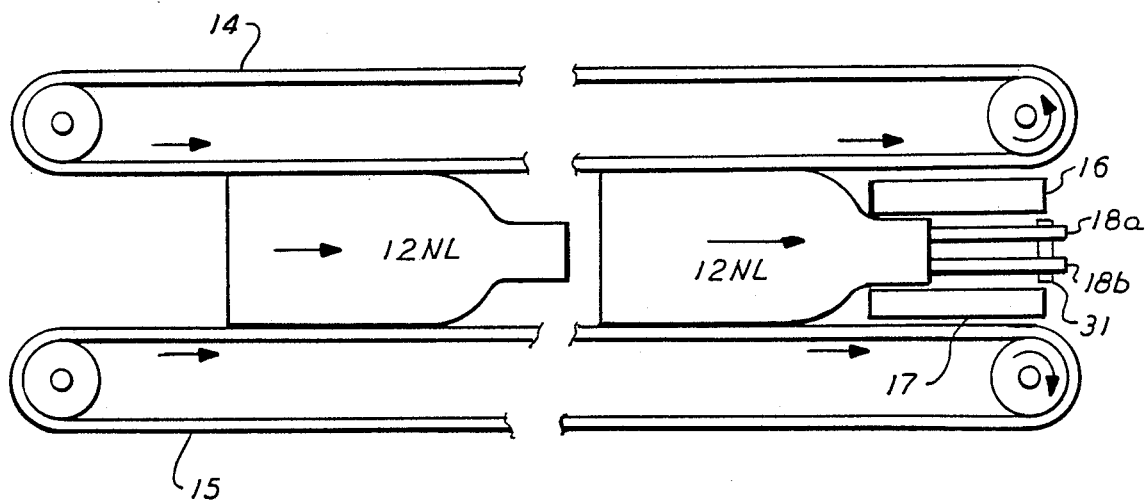
FIG. 2a is a representation in plan view of FIG. 2.

As seen more clearly in FIGS. 2 and 2a, as the bottle 12NL (neck leading) approaches the righting apparatus the neck of the bottle passes between the split ramp 16/17 and engages the belts 18a/18b. The belts 14 and 15 drive the bottle forward and the inclined belt 18a/18b provide a lifting action exerted on the neck, lifting the bottle in a counter clockwise direction, when the bottle is traveling from left to right, as assumed in FIGS. 2 and 2a.

The bottles 12 are conveyed forward, up the ramps by the belts 14 and 15 during the uprighting operation. At the top of the split ramps the standing bottle may be secured by another set of belts represented by 21 and 22, the bottle to be conveyed to subsequent operations or processing.

Figure 3:
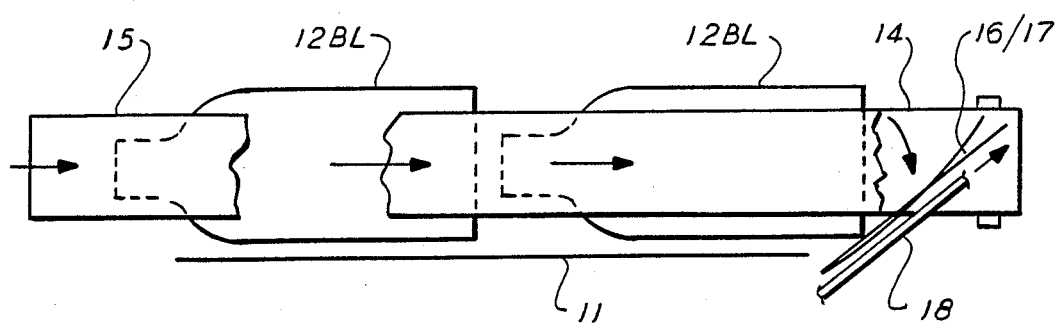
FIG. 3 is a representation, in side view of bottles in a conveyor system approaching the uprighting orientation apparatus in base leading alignment.
Figure 3A:
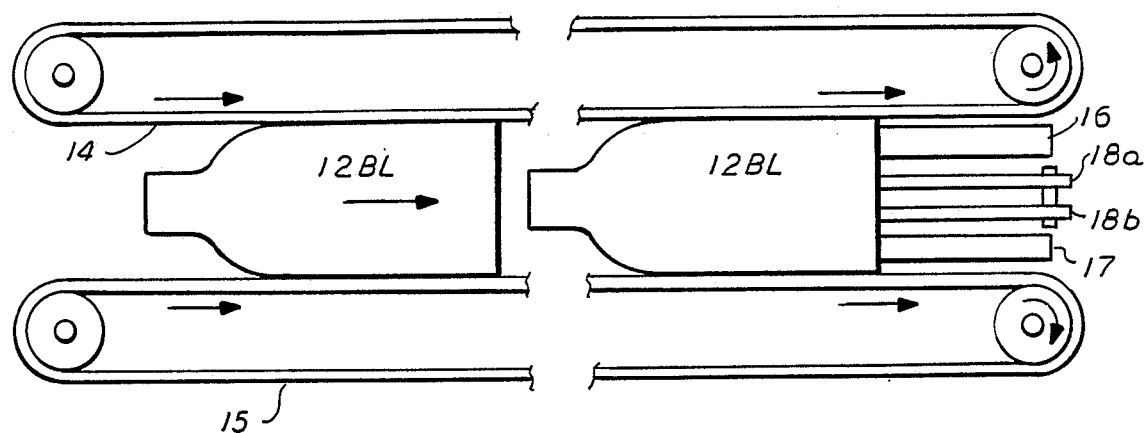
FIG. 3a is a representation, in plan view of FIG. 3.

Referring to FIGS. 3 and 3a, bottles 12BL (base leading) are secured for travel by belts 14 and 15, moving toward the inclined split ramps 16/17 and moving belt 18. The base of the bottle 12BL engages the stationary split ramps since the belt 18 is at a plane somewhat below the split ramps. The inclined split ramps 16/17 function as a fulcrum and, in cooperation with the moving belts 14 and 15, carry the bottle 12BL forward the bottle 12BL is levered forward in a clockwise direction, as represented in FIGS. 3 and 3a where it is assumed that the bottles are traveling from left to right, in such manner as to upright the bottle and stand the bottle on its base. Subsequent guides may be used to place the bottle firmly on a moving conveyor for transfer to subsequent operations or further processing.

It will be noted in FIG. 2 that the belt 18 is positioned in a plane somewhat below the plane in which the surfaces of the split ramp 16/17 lie. A means to drive the belt 18 is also represented at 29. The angle of inclination of the split ramp is adjustable as represented by the adjustable mount 23 which is secured to the upper end of the ramp. An adjustable coupling such as represented at 24 may be used to compensate for the change in angle of inclination while the ramp may be raised or lowered to change the angle by the threaded shaft 25 and nut 26 combination. The nut 26 may be run up the shaft 25 to lower the shaft 25 into the hollow base 27 thus changing the angle.

FIG. 2a shows that the dual belts 18a/18b include idler wheels 31, which also may be connected to angle adjusting hardware. The angle adjusting hardware attached to the belt drive or belt idle mechanism may be independent of the angle adjustment hardware attached to the split ramp so that both the split ramp and the belts may be adjusted independent of each other.

It will be appreciated that bottles are made in a wide variety of sizes and shapes and it may be desirable to curve the split ramp 16/17 somewhat, as represented in FIG. 3. This is sometimes helpful in high speed operation, depending on the shape of the bottle.

The distance between the ramp 16 and 17 is also adjustable. This is represented in FIG. 2 by the rod 28 along which the base 27 may be positioned.

The belts 18a and 18b are preferably narrow and somewhat flexible so that the neck of a bottle may become engaged between the running belts and be positively lifted during the uprighting operation. It will be appreciated that the spacing between the belts is also adjustable and depends on the size of the neck of the bottle for spacing parameters.

Preferably the speeds of the belts 18a and 18b are at the same speed and the speed of belts 18a and 18b is substantially equal to or the same as the speed of belts 14 and 15 which carry the bottle either neck leading or base leading into the split ramp/belt assembly.

The exit mechanism or ramp may be a slide or moving surface. Guide means, well known in the art, may be used in order to ensure the stability of the uprighted bottle when the bottle is stood on the exit ramp.

Thus there has been shown and described bottle orientation apparatus for uprighting both neck leading and base leading bottles in a conveyor system in which the apparatus is highly and individually adjustable to the extent that the apparatus preforming one operation may be adjusted without adverse effect on apparatus preforming another operation. Although several embodiments of the invention have been represented and described and a preferred embodiment has been described and other forms suggested, changes and modifications may be made, as will become apparent to those skilled in the art after disclosure is made, without departing from the concept and principals of the invention.

What is claimed is:

1. A bottle orientation apparatus for the uprighting, on their bases, of a plurality of bottles, whether neck leading or base leading said orientation apparatus comprising:
   (a) means for conveying each bottle of said plurality of bottles in direction parallel to the axis extending between the neck and the base of said bottle;
   (b) spaced ramp means, spaced from each other, defining an upward inclined ramp disposed in the path of said bottles while being conveyed by said conveying means;
   (c) belt means disposed between the respective ramps of said spaced ramp means and upwardly inclined at or near the angle of inclination of said spaced ramp means said belt means being driven in an upward direction;
   (d) said spaced ramp means interfering with the forward progress of a base leading bottle being conveyed by said conveying means so as to form a fulcrum at the said base of said bottle cooperating with said conveying means for levering the neck of said bottle upward and forward, pivoting on said base into an upright position.

2. A bottle orientation apparatus as in claim 1 and in which said spaced ramp means is adjustable with respect to the angle of inclination.

3. A bottle orientation apparatus as in claim 1 and in which said spaced ramp means is two ramps in spaced apart relation with respect to each other.

4. A bottle orientation apparatus as in claim 3 and in which the spacing between said two ramps exceeds the outside diameter of the neck of said bottle.

5. A bottle orientation apparatus as in claim 4 and in which said belt means includes a pair of moving belts disposed between the respective ramps of said spaced ramp means.

6. A bottle orientation apparatus as in claim 5 and in which said pair of moving belts interfere with the forward progress of a neck leading bottle being conveyed by said conveying means by changing the direction of travel of the neck of said bottle and said bottle from a linear direction to an upward arcuate direction for pivotting said bottle into an upright position on its base.

7. A bottle orientation apparatus as in claim 5 and in which said means for conveying conveys a neck leading bottle toward said two spaced ramps and through the space between said two spaced ramps and into said pair of moving belts for changing the direction of travel of said bottle from a linear direction of travel to an arcuate direction of travel for repositioning said bottle into an upright orientation on its base.

8. A bottle orientation apparatus as in claim 5 and in which said pair of moving belts are positioned side by side in spaced relation and the spacing of said spaced relation is adjustable.

9. A bottle orientation apparatus as in claim 1 and in which said means for conveying includes a pair of spaced belts, the spacing being substantially equal to the smallest cross-sectional dimension of said bottle.

10. A bottle orientation apparatus for uprighting bottles on the base thereof from a prone position when proceeding along a conveyor whether the bottle is in neck leading alignment or base leading alignment, said orientation apparatus including:
  (a) means for conveying each bottle in a direction parallel to the axis extending between the neck and the base of said bottle;
  (b) split ramp means spaced from each other, for permitting passage of at least part of a neck leading bottle between the respective ramps of said split ramp means, said split ramp means positioned in the path of said bottle;
  (c) belt means disposed between said respective ramps of said split ramp means and in said path of said bottle for interfering with the direct forward progress of a neck leading bottle and for changing the direction of travel of said neck leading bottle from a linear direction to an arcuate direction with the neck of said bottle traveling upward for uprighting said bottle on its base.

11. A bottle orientation apparatus as in claim 10 and in which said belt means is driven in the general direction of travel of said bottle.

12. A bottle orientation apparatus as in claim 11 and in which the speed at which said belt means is driven is adjustable.

13. A bottle orientation apparatus as in claim 10 and in which said belt means includes a pair of spaced belts disposed between said respective ramps of said split ramp means.

14. A bottle orientation apparatus as in claim 13 and in which said pair of spaced belts grasp the neck of an engaging bottle and carry said bottle in an upward arcuate direction for uprighting said bottle on its base.

15. A bottle orientation apparatus as in claim 10 and in which said belt means is inclined in an upward direction from the linear path of said bottle.

16. A bottle orientation apparatus as in claim 15 and in which the angle of inclination of said belt means is adjustable.

17. A bottle orientation apparatus as in claim 10 and in which the surface of said split ramp means is in a first plane and the upper surface of said belt means is in a second plane spaced from said first plane.

* * * * *